United States Patent [19]
Sakurada

[11] Patent Number: 5,371,723
[45] Date of Patent: Dec. 6, 1994

[54] RECORDING AND REPRODUCING SYSTEM FOR USE WITH DIFFERENT ARRANGEMENTS OF OPTICAL CARDS

[75] Inventor: Takefumi Sakurada, Akishima, Japan

[73] Assignee: Olympus Optical Co., Ltd., Tokyo, Japan

[21] Appl. No.: 807,587

[22] Filed: Dec. 16, 1991

[30] Foreign Application Priority Data

Dec. 19, 1990 [JP] Japan .................. 2-411612

[51] Int. Cl.⁵ .............................................. G11B 11/00
[52] U.S. Cl. ...................... 369/15; 235/454; 235/479
[58] Field of Search ................ 369/32, 13, 14, 15, 369/33, 44.32, 258; 360/2, 59; 235/476, 380, 454, 475, 479

[56] References Cited

U.S. PATENT DOCUMENTS

| | | | |
|---|---|---|---|
| 4,937,684 | 6/1990 | Kurihara et al. | 360/2 |
| 4,972,068 | 11/1990 | Ohtani et al. | 369/14 |
| 5,083,301 | 1/1992 | Matoba et al. | 369/32 |
| 5,130,521 | 7/1992 | Shino et al. | 360/2 |

FOREIGN PATENT DOCUMENTS

| | | | |
|---|---|---|---|
| 62-92267 | 4/1987 | Japan | 369/15 |
| 62-270026 | 11/1987 | Japan | 369/15 |
| 62-270080 | 11/1987 | Japan | 369/15 |
| 63-31084 | 2/1988 | Japan | 369/15 |

Primary Examiner—Robert J. Pascal
Assistant Examiner—Tan Dinh
Attorney, Agent, or Firm—Stevens, Davis, Miller & Mosher

[57] ABSTRACT

An apparatus for recording and/or reproducing information on and/or from an optical card, including a plurality of control system units and a driving system unit; in addition the control system units are arranged to be exchangeable. A user selects one of the control system units, which corresponds to an arrangement of an optical card to be used, and applies it to the apparatus, while the driving system unit select operational parameters of the optical card and an optical head which are suitable for driving the optical card to be used in response to a command from the selected control system unit, so that a plurality of optical cards each having a different arrangement can be applied for only one optical card apparatus.

17 Claims, 2 Drawing Sheets

FIG_1
PRIOR ART
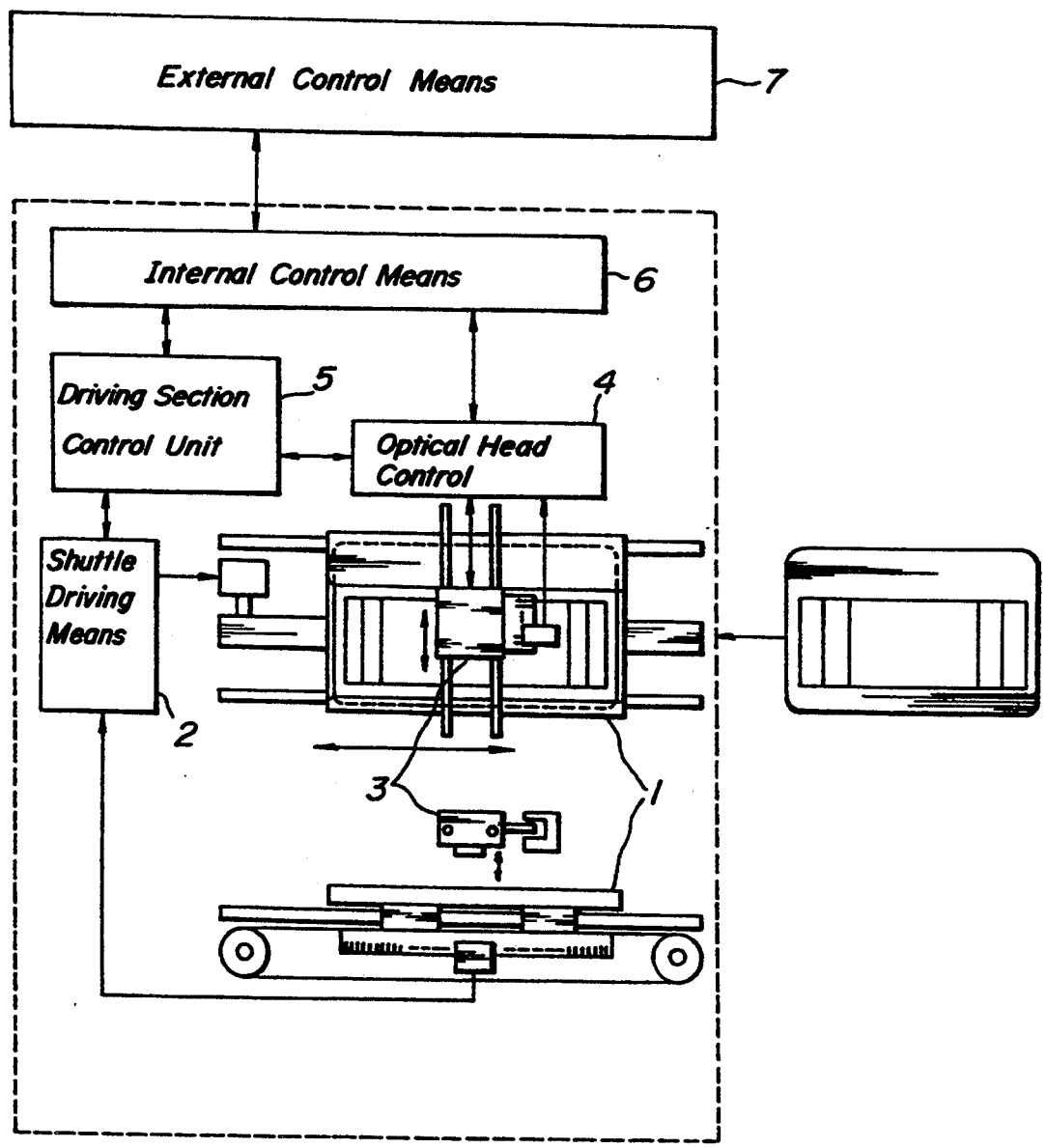

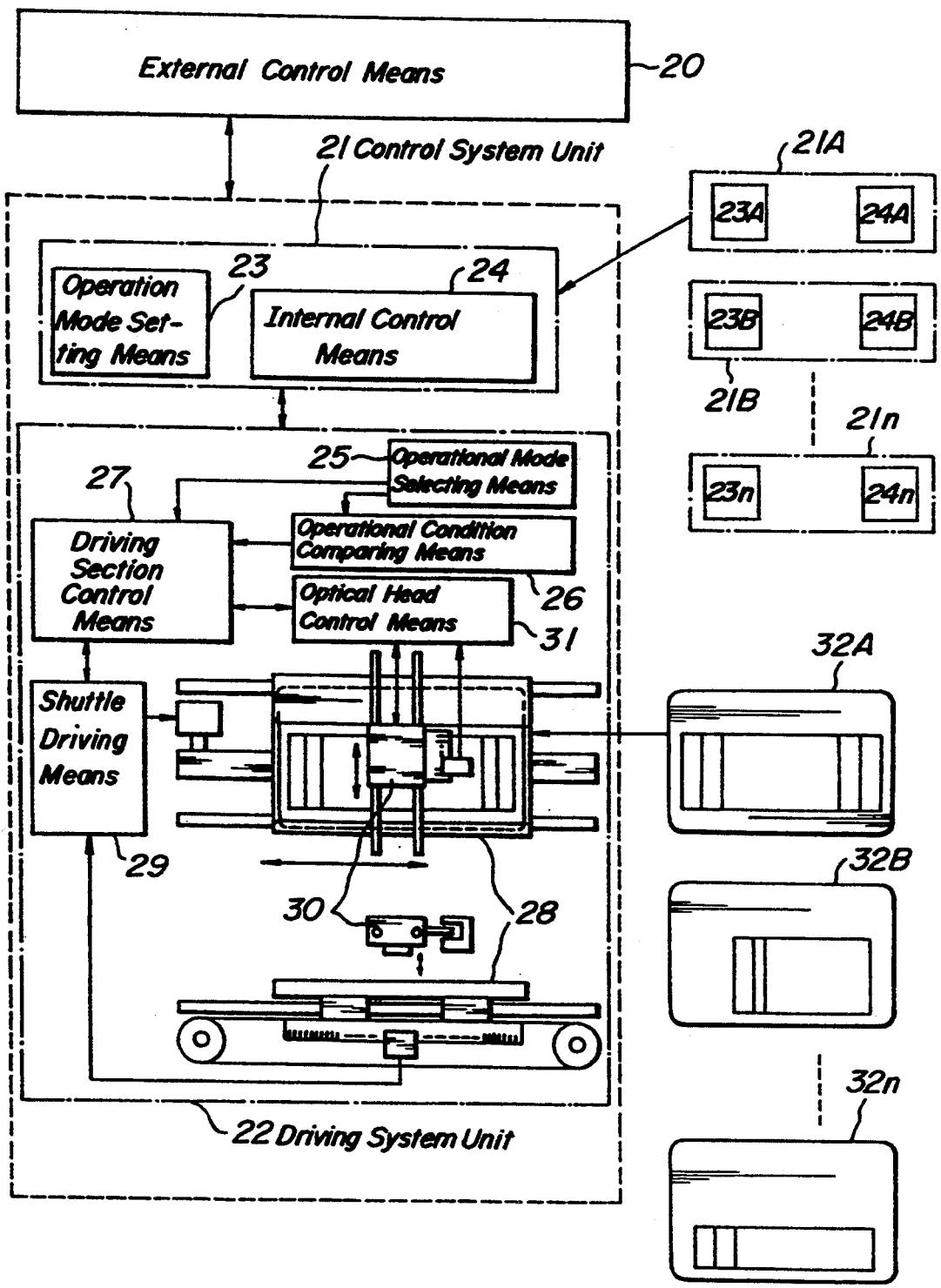
FIG_2

RECORDING AND REPRODUCING SYSTEM FOR USE WITH DIFFERENT ARRANGEMENTS OF OPTICAL CARDS

BACKGROUND OF THE INVENTION

1) Field of the Invention

The present invention relates to an apparatus for recording and/or reproducing optical information on and/or from an optical card and particularly relates to an apparatus comprising exchangeable controlling system units, which are for setting an operational mode of the apparatus, and a driving system unit, which is for relatively driving an optical head and an optical card with respect to each other in response to an output of one of the controlling system units, the controlling system units being exchanged by a user in accordance with a type of optical card to be used. Therefore, in the apparatus according to the invention it is possible to apply a plurality optical cards, each of them having a different arrangement of the information recording area.

2) Description of the Related Art

On an optical information recording medium such as an optical card, it is impossible to rewrite optical information, which has already been written thereon. However, the optical card has a great memory capacity, i.e., about several thousand times to ten thousand times as large as that of a magnet card. The optical card has a memory capacity of about from one to two megabytes, so that a great number of applications such as a bankbook, a pocket map and a prepaid card for shopping can be considered.

On the optical card, there are arranged a plurality of information tracks in a straight and parallel manner in a given area of the surface thereof. In the apparatus for recording/reproducing optical information using an optical card as an information recording medium, it is arranged that a light beam spot is made incident upon the information track area formed on the surface of the optical card, and then the optical card and the optical head are relatively moved with respect to each other in a track direction, which is parallel with an extending direction of the information tracks, to record and/or reproduce optical information on and/or from the optical card. In such an apparatus, it is further arranged that the optical card and the optical head are relatively moved to each other in a tracking direction, which is perpendicular to the track direction, to place the light beam spot on a desired information track.

In such an apparatus, the optical card is reciprocally moved with respect to the optical head in the track direction while generally being contained in a container, a so called "shuttle"; on the other hand, the optical head, by which the light beam spot is made incident upon the information track area of the optical card, is driven with respect to the optical head in the tracking direction.

FIG. 1 is a block diagram showing a general construction of a conventional apparatus for recording and/or reproducing optical information on and/or from an optical card.

As shown in FIG. 1, the conventional apparatus comprises a shuttle 1 for containing an optical card; a shuttle driving means 2 for moving the shuttle 1 in the track direction for a given distance at a given constant speed in a reciprocal manner; an optical head 3 for making a light beam spot incident upon the information track area formed on the optical card; an optical head control means 4 for driving the optical head 3 in the tracking direction and controlling a light intensity of the light beam emitted from the optical head 3 in accordance with an operation mode of the apparatus, i.e., information recording mode or information reproducing mode; a driving section control means 5 for controlling the movements of the shuttle 1 and the optical head 3; and an internal control means 6 for controlling the driving section control means 5 and for reading out information picked up by the optical head 3 and/or writing optical information on the information tracks via the optical head control means 4. Further, an external control means 7 is connected to the apparatus; operations in the apparatus are performed in accordance with signals supplied from the external control means 7.

The operation of the conventional apparatus is as in the following.

In an initial condition of the apparatus, in response to a signal supplied from the external control means 7, the internal control means 6 sends commands to the driving section control means 5 and the optical head control means 4, respectively, to relatively move the optical head 3 and the shuttle 1 containing the optical card therein in the track and tracking directions and to recognize the position of the optical head with respect to the optical card. That is to say, the shuttle 1 is driven in the tracking direction in a reciprocal manner in response to a signal supplied from the driving section control means 5 via the shuttle driving means 2, and a light beam emitted from the optical head 3 traces one of the information tracks formed on the optical card by the movement of the shuttle 1; and then the internal control means 6 reads out a track address of the information track traced by the light beam to recognize the position of the optical head 3 with respect to the optical card.

The operation of the conventional apparatus when recording and/or reproducing optical information on and/from a specific track of the tracks formed on the optical card is as follows.

A desired track is sought in the following manner. Track address information of the desired track is supplied to the internal control means 6 from the external control means 7; and then the internal control means 6 sends track address information to the driving section control means 5. In the driving section control means 5, an optical head control signal is output to the optical head control means 4, firstly; the optical head control means 4 produces an optical head driving signal to the optical head 3 to move the optical head 3 on the desired track in response to the optical head control signal. Second, the driving section control means 5 sends a shuttle control signal to the shuttle driving means 2; the shuttle driving means 2 generates a shuttle driving signal to drive the shuttle for a given distance at a given constant speed in response to the shuttle control signal. Meanwhile, the internal control means 6 reads out track information of the relevant track via the optical head control means 4. If track address information of the relevant track read out thereby is different from a track address of the desired track, the above mentioned operation is repeated until the optical head 3 is positioned on the desired track.

When recording information on the specific track of the optical card, the internal control means 6 sends a signal representing an information recording mode to the driving section control means 5; and then the driving section control means 5 provides a signal representing that the next operation is for recording information to the container driving means 2 and the optical head control means 4, respectively. In response to this signal, the shuttle driving means 2 serves to reciprocally drive the shuttle 1 in the track direction for a given distance at a given constant speed, while, the optical head control means 4 serves to change a light intensity of the light beam emitted from the optical head 3 to an intensity for recording information. The internal control means 6 outputs information to be recorded, which is sent from the external control means 7, to the optical head 3 via the optical head control means 4; then the light beam spot emitted from the optical head 3 traces the relevant information track on the optical card with the aid of the movement of the shuttle 1, so that information is recorded on the optical card.

When reproducing information from the optical card, the internal control means 6 sends a signal representing an information reproducing mode to the driving section control means 5, then the driving section control means 5 provides a signal representing that the next operation is for reproducing information to the shuttle driving means 2 and the optical head control means 4, respectively. In response to this signal, the shuttle driving means 2 serves to drive the shuttle 1 for a given distance at a given constant speed in the track direction; while, the optical head control means 4 serves to change the light intensity of the light beam emitted from the optical head 3 to an intensity for reproducing information. The light beam spot having the intensity for reproducing information traces the relevant information track formed on the optical card with the aid of the movement of the shuttle 1, so that the internal control means 6 reads out information which has been recorded on the optical card thereby. Additionally, the thus read out information is sent to the external control means 7.

By repeating the operations stated above in accordance with the signal supplied from the external control means 7, it is possible to record and/or reproduce information on and/or from the optical card.

However, in such a conventional apparatus, one apparatus can be applied for only one type of optical cards having the same structure. Therefore, in case of an application dealing with a plurality of types of optical cards, it is necessary to provide a plurality of apparatuses corresponding to the types of optical cards to be used, and further necessary to provide a suitable system in each apparatus. But it takes much money, a lot of time and great labor.

If the apparatus were arranged to be able to apply for the plurality of types of optical card, a circuit construction thereof would be very complex, and since elements having great capacitances are required, the apparatus would become large in size. Contrarily, if such an apparatus were used in an application for which only one type of optical card were applied, it would cause an over specification problem, and thus it would be difficult to operate such an apparatus.

Furthermore, in the case optical cards having different arrangement of information track areas or optical cards having different minimum track addresses and different maximum addresses are used in such apparatus, there would be many troubles caused in the apparatus due to the differences; and in the worst case the apparatus would be out of order.

SUMMARY OF THE INVENTION

The present invention has been developed in order to reduce such troubles. In the apparatus according to the present invention, there are provided a plurality of control system units and a driving system unit; and the control system units are arranged to be exchangeable. Therefor, it is possible to use plural types of optical cards each having a different construction in only one apparatus without causing trouble, so that it is possible to provide an optical card apparatus compact in size, wide in use and high in reliability.

In order to carry out the purpose, an apparatus for recording and/or reproducing optical information on and/or from an optical card comprises:

control system units being arranged to be exchangeable for setting an operation mode of the apparatus in accordance with an arrangement of an optical card to be used; and a driving system unit comprising a container for containing said optical card therein, an optical head for making a light beam spot incident upon an information recording surface of said optical card, a driving means for driving the optical card and the optical head with respect to each other in said directions, respectively, and control means for controlling movements of said shuttle and said optical head in accordance with said operation mode set in said control system unit:

whereby said driving system unit is operated in said operation mode predetermined in one of the control system units which has been selected by a user in accordance with the arrangement of the optical card to be used.

As stated above, the apparatus according to the present invention comprises the exchangeable control system units and the driving system unit for relatively driving the optical card and the optical head with respect to each other; a user can select the control system unit in accordance with the type of optical card to be used and sets it in the apparatus; and the operational mode of the driving system unit is changed in response to a setting signal supplied from the selected control system unit. Therefore, it is possible to apply a plurality of types of optical card having different arrangement to one apparatus for recording and/or reproducing optical information on and/or from optical card.

BRIEF DESCRIPTION OF THE DRAWINGS

FIG. 1 is a block diagram showing a construction of the conventional apparatus; and FIG. 2 is a block diagram illustrating a construction of an embodiment of the apparatus according to the present invention.

DETAILED DESCRIPTION OF THE PREFERRED EMBODIMENT

As clear from FIG. 2, the optical card apparatus according to the invention comprises a plurality of control system units 21A, 21B . . . 21n and a driving system unit 22. In each control system unit 21, there are provided an operation mode setting means 23 (23A~23n) by which an operation mode corresponding to the type of optical card to be used is set for the driving system unit 22 and an internal control means 24 (24A~24n) by which the driving system unit 22 is controlled so as to perform its movements, and information reading and/or reproducing operations are controlled in response to signals supplied from an external control means 20, which is connected to the optical card apparatus.

The driving system unit 22 comprises an operation mode selecting means 25 by which necessary parameters are selected in response to the operation mode set in said control system unit 21, an operational condition comparing means 26 in which the parameters selected in the operation mode selecting means 25 are compared with the operation mode set in said control system unit 21 to judge whether each movement of the driving systems for the optical card and for the optical head should be performed or not; a driving section control means 27 by which the parameters selected in the operation mode selecting means 25 are set in each driving system and the moments of the optical card and the optical head are controlled in response to signals supplied from control system unit 21 and said operational condition comparing means 26; a container 28, so called "shuttle", for containing an optical card, a shuttle driving means 29 by which said shuttle 28 is driven in a track direction for a given distance at a constant speed within a driving range and with a driving speed thereof set by said driving section control means 27; an optical head 30 for making a light beam spot incident upon the information track formed on the optical card; and an optical head control means 31 by which said optical head 30 is relatively moved in a tracking direction with respect to the optical card in a reciprocal manner within a range set by said driving section control means 27 and a light intensity of said light beam is changed to a value set by the driving section control means 27.

The numerical number 21A, 21B . . . 21n represent the exchangeable control system units and 32A 32B . . . 32n optical cards to be used in the apparatus. When the optical card 32A, on which an optical information recording area is formed in an almost half lower part in its short direction and all along its longitudinal direction and in which two ID portions are provided on both sides of the information recording area, is used, for instance, the user selects the control system unit 21A, which is arranged to correspond to the arrangement of the optical card 32A, and applies it to the apparatus. The operational movement of the apparatus is as follows.

When the optical card apparatus is initiated, the operation mode setting means 23A of control system unit 21A applied by the user sends a signal representing that the optical card 32A is suitable for the selected control system unit 21A to the operational mode selecting means 25 provided in the driving system unit 22. In the operational mode selecting means 25, all sorts of parameters corresponding to the arrangement of the optical card 32A are selected in response to the input signal, and these parameters are sent to the driving section control means 27 as an output. In the driving section control means 27, parameters concerning the operation of the shuttle 28 are selected from all parameters to be supplied to the shuttle driving means 29; and parameters concerning the operation of the optical head 30 are also selected and then supplied to the optical head control means 31. In the shuttle driving means 29, a driving pattern corresponding to the optical card 32A is selected from driving pattern table area (not shown in FIG. 2) to be set in a shuttle driving circuit (not shown). And the shuttle 28 is moved aside, in order to be ready for the next operation, to be performed in accordance with a signal supplied from the external control means 20.

On the other hand, in the optical head control means 31, light intensity data corresponding to the arrangement of the optical card 32A for the information reading operation and the information writing operation are set in a light source driving circuit (not shown) of the optical head control means 31 in accordance with the parameters supplied from the driving section control means 27. And the optical head 30 is moved to be placed on the information track area of the optical card 32A under the control of the optical head control means 31, in order to be ready for the next operation, to be performed in accordance with a signal supplied from the external control means 20.

Control signals from the external control means 20 are supplied to the shuttle driving means 29 and the optical head control means 30, respectively, via the internal control means 24A of the control system unit 21A and the driving section control means 27 of the driving system unit 22. In response to the control signals, the shuttle 28 and the optical head 30 are moved in accordance with the arrangement of the selected optical card 32A. That is to say, the shuttle 28 is reciprocally driven in the track direction in accordance with the driving pattern for the optical card 32A selected by the shuttle driving means 29, so that the information track formed on the optical card 32A held in the shuttle 28 is traced by the light beam spot, whose light intensity is set for the information reading out mode by the optical head control means 31 so as to satisfy with the arrangement of the optical card 32A. The track address of an information track on which the optical head 30 is placed is read out by the internal control means 24A in such a manner as to recognize the position of the optical head 30 with respect to the optical card 32A.

The operation of the optical card apparatus to record and/or reproduce optical information on and/or from a specific information track is performed by operating the external control means 20 as stated in the following.

Address information of a desired track is sent to the internal control means 24A of the selected control system unit 21A from the external control means 20; and the internal control means 24A further sends address information of the desired track to the operational condition comparing means 26 and the driving section control means 27, respectively. In the operational condition comparing means 26, address information sent from the internal control means 24A is compared with a quantity of track address information of the optical card 32A, which has been already held in the shuttle 28, sent from the operational mode selecting means 25 in order to judge whether address information supplied from the internal control means 24A is suitable for the optical card 32A and whether it is possible to operate the optical head 30 in accordance with address information.

In case it is judged in the operational condition comparing means 26 that the optical head 30 cannot possible to be moved in accordance with address information supplied from the internal control means 24A, the operational condition comparing means 26 sends a signal to the driving section control means 27 that address information supplied from the external control means 20 is not suitable for the optical card 32A. In response to the signal, the driving section control means 27 makes an order to the optical head control means 31 so as not to move the optical head 30 to the track of the desired address information and returns the desired address information to the external control means 20.

In case it is judged in the operational condition comparing means 26 that the optical head 30 can be moved in accordance with address information supplied from the internal control means 24A, the operational condition comparing means 26 outputs a signal representing that the desired track address information from the external control means 20 is suitable for the optical card 32A to the driving section control means 27. In response to this signal, the driving section control means 27 sends a signal to the optical head control means 31 in order to move the optical head 30 on the desired track and a signal to the shuttle control means 29 in order to drive the shuttle 28 for a given distance and at a constant speed which corresponds to the arrangement of the optical card 32A. On the other hand, information recorded on the optical card 32A is read out by the internal control means 24A via the optical head control means 31; and if the thus read out track address information is not the same as the desired address, the operation mentioned above is repeated until the desired track is found out.

In order to record information on the optical card, the internal control means 24A sends a signal representing an information recording operation to the driving section control means 27. From the driving section control means 27 is supplied a signal indicating that the next operation is for recording information to the shuttle control means 29 and the optical head control means 31, respectively. In the shuttle control means 29, a signal for driving the shuttle 28 for the given distance and at the constant speed corresponding to the optical card 32A is applied to the shuttle driving circuit (not shown); at the same time, in the optical head control means 31, the light source driving circuit (not shown) is controlled such that the light intensity of the light beam is changed into a light intensity for recording information on the optical card 32A. The internal control means 24A sends information to be recorded, which has been supplied from the external control means 20, to the optical head 30 via the optical head control means 31; information is recorded on the optical head 32A with the aid of the light beam spot, which is relatively moved with respect to the optical card 32A according to the movement of the shuttle 28 to trace the information tracks formed thereon.

In case of reproducing the thus recorded information, the internal control means 24A sends a signal representing that an information reproducing operation will be performed to the driving section control means 27. The driving section control means 27 sends a signal representing that the next operation is for reproducing information to the shuttle control means 29 and the optical head control means 31, respectively. In response to the output of the driving section control means 27, the shuttle 28 is driven for a given distance at a constant speed by the shuttle control means 29; and the light intensity of the light beam emitted from the optical head 30 is changed to the intensity for reproducing information in accordance with the optical card 32A by controlling the light source driving circuit (not shown) of the optical head control means 31. According to the movement of the shuttle 28, the light beam spot traces the information track of the optical card 32A to reproduce information recorded thereon; additionally, the internal control means 24A outputs thus reproduced information to the external control means 20.

By repeating the above mentioned operation in accordance with the external control means 20, optical information is recorded and/or reproduced on and/or from the optical card 32A.

Similarly, in case the optical card 32B, which has a different arrangement from that of the optical card 32A, is used, the user selects the control system unit 21B, which corresponds to the arrangement of the optical card 32B; and in case that the optical card 32$n$ is used, the user selects the control system unit 21$n$, in the same manner; so that an operational mode corresponding to the arrangement of the optical card to be used is selected in the apparatus to record and/or reproduce on and/or from each optical card in a best manner.

In the above mentioned embodiment, it is arranged such that a plurality of driving patterns of the shuttle corresponding to the arrangement of optical cards to be used are prepared and a relevant pattern is selected therefrom in accordance with the type of the selected optical card; but it may be possible to arrange such that only one driving pattern is prepared and parts thereof, which are necessary for driving the shuttle in order to record/reproduce information on/or from the selected optical head, are selected from the pattern to construct a necessary driving pattern of the shuttle. Concerning the driving pattern of the optical head, the same proposal may be applied.

Controlling of the light intensity of the light beam emitted from the optical head may be performed such that a plurality of light source driving circuits corresponding the arrangements of the optical cards to be used are prepared and a relevant circuit is selected with the aid of a relay or an analog switch, etc; or such that one light source driving circuit is prepared and an input for a D/A converting means thereof for determining the light intensity of the light beam is varied in accordance with the type of optical card to be used.

In the optical card apparatus according to the present invention, there are provided a plurality of control system units and a driving system units; the control system unit are arranged to be exchangeable; and the operational mode of the driving system unit (parameters, such as a moving range, a moving speed of the shuttle, and a moving range of the optical head, and a light intensity of the light beam) is changed in accordance with the type of optical card to be used. Therefore, only one optical card apparatus can be applied for a plurality of types of optical card. Further, if a hardware correspondence is prepared in the optical card apparatus, it is possible to apply the apparatus for other information recording media, for example, an IC card, etc.

Furthermore, in the apparatus according to the present invention, it is possible to prevent such an accident caused in case that the shuttle or the optical head moves over a tolerance moving range of the optical card or over a tolerance moving range of the mechanical structure of the apparatus, because in the apparatus, whether the signal supplied from the external control means and the used parameters are allowed to be used for the now used optical card is first judged, and then each operation is performed in order to suitably record and/or reproduce information on and/or from a plurality, types of optical card, in which the moving range and the moving speed of the shuttle and the moving range of the optical head are different from each other and further the maximum number and the minimum number of the track address are also different.

What is claimed is:

1. An apparatus for use with a plurality of types of optical cards, in which an optical card of one of the plurality of types and an optical head are relatively moved with respect to each other in directions which are perpendicular to each other, the apparatus comprising:

control selecting means, comprising a plurality of control system units, for setting an operation mode of the apparatus which is predetermined in one of said plurality of control system units which is selected by a user in accordance with a selected optical card to be used, the selected optical card being of one of the plurality of types of optical card; and a driving system unit comprising (i) a driving means for causing relative movement of the optical card and the optical head with respect to each other in said directions and (ii) control means for controlling said relative movement of said optical card and said optical head in accordance with said operation mode set in said control selecting means;

whereby said driving system unit is operated in said operation mode predetermined in said one of the control system units which has been selected by said user in accordance with the selected optical card to be used.

2. An apparatus according to claim 1, further comprising an external control means for supplying information to be recorded to said control system unit and said driving system unit during an information recording mode in which said apparatus records said information to be recorded on said optical card.

3. An apparatus according to claim 1, further comprising an external control means for receiving information recorded on the optical card during an information reproducing mode in which said apparatus reproduces said information recorded on the optical card.

4. An apparatus according to claim 1, wherein:
each of said plurality of control system unit comprises an operational condition setting means for setting an operational mode of the driving system unit in accordance with the arrangement of the optical card to be used; and an internal control means for controlling the movement of the optical card and the optical head and for controlling an information reproducing operation for reproducing information recorded on the optical card and an information recording operation for recording information on the optical card.

5. An apparatus according to claim 1, wherein:
said driving system unit comprises (i) an operational mode selecting means for selecting parameters for driving the optical card and the optical head in accordance with the optical mode set in said control system unit and (ii) an operation condition comparing means for comparing the parameters selected in the operational mode selecting means with an operational mode set in the selected one of the plurality of control system units to judge whether the operation of each driving system should be performed or not.

6. An apparatus according to claim 1, wherein:
said driving means comprises an optical card driving means for driving said optical card in a track direction which is parallel with an extending direction of tracks formed on the optical card for a given distance at a constant speed in accordance with an output of said control means and a optical head control means for reciprocally driving said optical head in a tracking direction, which is perpendicular to said track direction, within an optical head moving range set in said control means.

7. An apparatus according to claim 1, wherein:
said control means of said driving system unit comprises an operational mode selecting means for operating, responsive to a selection made in said control selecting means in an initial condition at which an optical card is selected to be used and one of the plurality of control system units corresponding to the selected optical card is applied to the apparatus, to select operational parameters for driving said optical card and said optical head, to output said operational parameters to the driving means, to determine a driving pattern of the optical card, to set light intensity data of a light beam emitted from the optical head, and to move the optical card and the optical head to their home positions.

8. An apparatus according to claim 7, wherein:
said control means of said driving system unit further comprises means for driving, responsive to control signals supplied from a selected one of the plurality of control system units, the driving means to cause relative movement of the optical card and the optical head in one of the perpendicular directions to read out an address of an information track on which the optical head is positioned, in order to recognize a position of the optical head with respect to the optical card.

9. An apparatus according to claim 1, wherein:
said control means of said driving system unit comprises operational condition comparing means for comparing, responsive to a desired address information being supplied to the operational condition comparing means from a selected one of the plurality of control system units, (i) the desired address information with (ii) track address information which is allowed for the selected optical card, the track address information being supplied from the control selecting means, and means for judging whether the desired address information is suitable for the selected optical card and whether it is possible to drive the optical head in accordance with the desired track address information.

10. An apparatus according to claim 9, wherein:
said operational condition comparing means comprises means for controlling, responsive to said operational condition comparing means judging that the optical head can be driven in accordance with the desired address information, the driving means to position the optical head on a track of the selected optical card identified by the desired address information and to drive the selected optical card reciprocally driven in a direction along the track for a given distance and at a constant speed, in accordance with an arrangement of the selected optical card, to detect information recorded on the track.

11. An apparatus according to claim 10, wherein:
said control means of said driving system unit comprises means for deriving detected track address information from the information recorded on the track and for comparing the detected track address information with the desired address information and means for repeatedly comparing, when the detected track address information is different from the desired address information, (i) the desired address information and (ii) the track address information allowed for the selected optical card and judging whether the optical head can be driven in accordance with the track address information allowed for the selected optical card to find out the track identified by the desired address information.

12. An apparatus according to claim 9, wherein:
each of said plurality of control system units comprises internal control means for sending, when information is to be recorded on the selected optical card, a signal representing that a next operation is for recording information to the control means of the driving system unit; and wherein the control means of the driving system unit comprises means for controlling, responsive to the signal sent by the internal control means, (i) the driving means to drive the selected optical card in a tracking direction of the selected optical card for a given distance and at a constant speed, in accordance with an arrangement of the selected optical card, and (ii) a light intensity of a light beam emitted from the optical head so as to become an intensity for recording information on the selected optical card, so that the light beam traces a track to record information by movement of the optical card.

13. An apparatus according to claim 9, wherein:
each of said plurality of control system units comprises internal control means for sending, when information is to be reproduced from the selected optical card, a signal representing that a next operation is for reproducing information to the control means of the driving system unit; and wherein the control means of the driving system unit comprises means for controlling, responsive to the signal sent by the internal control means, (i) the driving means to drive the selected optical card in a tracking direction of the selected optical card for a given distance and at a constant speed, in accordance with an arrangement of the selected optical card, and (ii) a light intensity of a light beam emitted from the optical head so as to become an intensity for reproducing information from the selected optical card, so that the light beam traces a track to reproduce information by movement of the optical card.

14. An apparatus according to claim 1, wherein:
each of said plurality of control system units comprises means for storing data of one of a plurality of driving patterns for driving the optical card, each of the plurality of driving patterns corresponding to one of the plurality of types of optical cards; and wherein said control selecting means comprises means for outputting one of said plurality of the data of one of the plurality of driving patterns stored in the selected one of the plurality of control system units to the control means of the driving system unit to control the relative movement in accordance with the selected optical card.

15. An apparatus according to claim 1, wherein:
each of said plurality of control system units comprises means for storing data of a portion of a common driving pattern for driving the plurality of types of optical cards; and wherein said control selecting means comprises means for outputting one of said plurality of the data of a portion of the common driving path stored in the selected one of the plurality of control system units to the control means of the driving system unit to control the relative movement in accordance therewith.

16. An apparatus according to claim 1, wherein:
said driving system unit further comprises a plurality of light source driving circuits, each corresponding to one of the plurality of types of optical cards; and wherein said control selecting means comprises means for selecting, responsive to a selection of one of said control system units, one of the circuits in accordance with the selected optical card to control a light intensity of a light beam emitted from the optical head.

17. An apparatus according to claim 1, wherein:
said driving system unit further comprises one light source driving circuit for driving a light source of the optical head, said one light source driving circuit comprising means for determining a light intensity of a light beam emitted from the optical head in accordance with the selected optical card.

* * * * *